(12) United States Patent
Xiang et al.

(10) Patent No.: US 7,359,006 B1
(45) Date of Patent: Apr. 15, 2008

(54) AUDIO MODULE SUPPORTING AUDIO SIGNATURE

(75) Inventors: Shuhua Xiang, Fremont, CA (US); Hongjun Yuan, San Jose, CA (US)

(73) Assignee: Micronas USA, Inc., Santa Clara, CA (US)

( * ) Notice: Subject to any disclaimer, the term of this patent is extended or adjusted under 35 U.S.C. 154(b) by 416 days.

(21) Appl. No.: 10/851,814

(22) Filed: May 20, 2004

Related U.S. Application Data

(60) Provisional application No. 60/472,177, filed on May 20, 2003.

(51) Int. Cl.
*H04N 9/475* (2006.01)

(52) U.S. Cl. ..................................... 348/515
(58) Field of Classification Search ............... None
See application file for complete search history.

(56) References Cited

U.S. PATENT DOCUMENTS

| | | | | |
|---|---|---|---|---|
| 4,739,398 A | * | 4/1988 | Thomas et al. ............. 725/22 |
| 5,483,538 A | * | 1/1996 | Rainbolt ..................... 370/509 |
| 6,188,987 B1 | * | 2/2001 | Fielder ........................ 704/501 |
| 6,246,439 B1 | * | 6/2001 | Zink et al. .................. 348/473 |
| 6,414,960 B1 | * | 7/2002 | Kuhn et al. ............. 370/395.64 |
| 6,513,161 B2 | * | 1/2003 | Wheeler et al. ............... 725/14 |
| 7,030,931 B2 | * | 4/2006 | Eckhardt et al. ............ 348/515 |
| 2002/0026635 A1 | * | 2/2002 | Wheeler et al. ............... 725/19 |
| 2004/0148159 A1 | * | 7/2004 | Crockett et al. ............. 704/211 |
| 2006/0195857 A1 | * | 8/2006 | Wheeler et al. ............... 725/15 |

* cited by examiner

*Primary Examiner*—Paulos M. Natnael
(74) *Attorney, Agent, or Firm*—Mayer Brown LLP

(57) ABSTRACT

A system and method embed an audio signature in a video frame. An audio signature is generated from one bit a buffer input data. Two registers store an audio signature and reference count. According to an embodiment, the audio signature is generated left/right (L/R) interleaved with the left channel data in the most significant bit (MSB).

15 Claims, 4 Drawing Sheets

… (1)

AUDIO MODULE SUPPORTING AUDIO SIGNATURE

CROSS-REFERENCE TO RELATED APPLICATION

This application claims priority to U.S. Provisional Patent Application No. 60/472,177 filed on May 20, 2003, which is incorporated herein by reference in its entirety.

BACKGROUND OF THE INVENTION

I. Field of the Invention

The present invention relates generally to audio and video synchronization, and more specifically to a system and method for audio and video synchronization using audio signatures.

II. Description of the Related Art

Encoded digital video streams are used in a variety of applications that allow videos to be distributed on a variety of media. For example, movies are commonly stored on Digital Video Disc (DVD).

Several encoding standards, such as MPEG, MPEG-2, MPEG-4, AVI, QuickTime, etc. have been developed for encoding and distribution of digital video streams. Different standards allow for varying degrees of functionality versus storage requirements. For example, MPEG-2 is primarily designed for encoding movies and other audio-visual works. Similarly, MPEG-4 is designed to handle video streams transmitted over low bandwidth communication channels.

The implementation of encoded digital video and audio stream presents numerous design challenges that were not encountered in the prior processing of analog audio and video signals. For example, with digital signal processing, the audio signals are separated from the video signals; and the audio and video are processed independently. However, the playback of the audio and video must be synchronized, so that there is a coordinated and coherent reproduction of the desired audio and video provided by the source of the program material.

For example, the program source may provide the audio and video data in respective data packets in an "MPEG-2" format. Each of the audio and video data packets is received from the source of video material in a continuous data stream. Each packet of video data includes a header block followed by a data block. The data block may include any number, for example one to twenty, of frames of video data that may include a full field of video data or be a coded group of pictures that includes its own header block identifying the picture type and display order. The header block for a video data packet includes control information, for example, the identity of the format of the video data, the type of compression, if used, picture size, display order, and other global parameters. The audio data packet has a header block that again identifies the format of the audio data with instructions relating to how the audio data is to be decoded and processed to provide desired enhancements, if applicable. Following the header block, the audio data packet includes an audio data block that has any number of blocks or frames of audio data, for example, from one to approximately twenty blocks.

Selected ones of the header blocks of the audio and video data packets include a presentation time stamp ("PTS") value which is a time stamp that is applicable to that data packet. The PTS value is a time reference to a system time clock that was running during the creation or recording of the audio and video data. A similar system time clock is also running during the playback of the audio and video data, and if the audio and video data are played back at the times represented by their presentation time stamps, the audio and video data will be presented to the user in the desired synchronized manner. Therefore, the PTS is used to synchronize the presentation or playback of the audio and video data.

The decoding of the video data normally requires decompression, conversion of partial frames into full frames and the recognition of full frames. Simultaneously with the decoding process, the frames of audio and video data are being output, that is, played back to the user; and that playback must be synchronized such that the frames of audio and video present a coordinated and coherent presentation.

A time stamp is included in each frame of an encoded video stream representing a desired playback time for each frame. Digital audio is frequently processed or encoded in blocks of digital samples that must be processed as a block. The decoder, in turn, examines the time stamps of each frame to determine whether the timing relationship among the frames in the encoded video stream is preserved during playback or whether playback timing must be adjusted to compensate for variations in the decoding/display process.

However, in doing audio and video capture, if the audio capture device uses a different clock from the video capture device, it is possible that the video frames might not synchronize with the relative audio samples because of the time shift between the two reference clocks. Moreover, frames may not synchronize if the audio or video data are lost due to buffer overflow. In addition, some devices or applications use the count embedded inside the audio stream as the basis for synchronizing audio and video. The quality of the audio/video synchronization of the resulting stream (e.g., AVI, MPEG, WMV, etc.) will be very poor if audio samples are dropped or the audio sample rate is not equal to the video sample rate. Accordingly, what is needed is a system and method for synchronizing audio and video stream, which will overcome the above limitations.

SUMMARY OF THE INVENTION

It is therefore an object of the present invention to provide an improved audio/video synchronous system and method that can eliminate one or more of the disadvantages inherent in the foregoing conventional technique.

According to one aspect of the present invention, the above need is met by a system and method that embeds an audio signature in the video frame. An audio signature is generated from one or more bits of a buffer input data.

According to an embodiment, two 32-bit registers are used to store an audio signature and a time stamp. According to an embodiment, the audio signature is generated left/right (L/R) interleaved with the left channel data in the most significant bit (MSB). The audio signature could be accessed through a C-Bus register.

BRIEF DESCRIPTION OF THE DRAWINGS

The accompanying drawings illustrate several embodiments of the invention and, together with the description, serve to explain the principles of the invention.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used.

Overview of Audio Module

Figure 1:
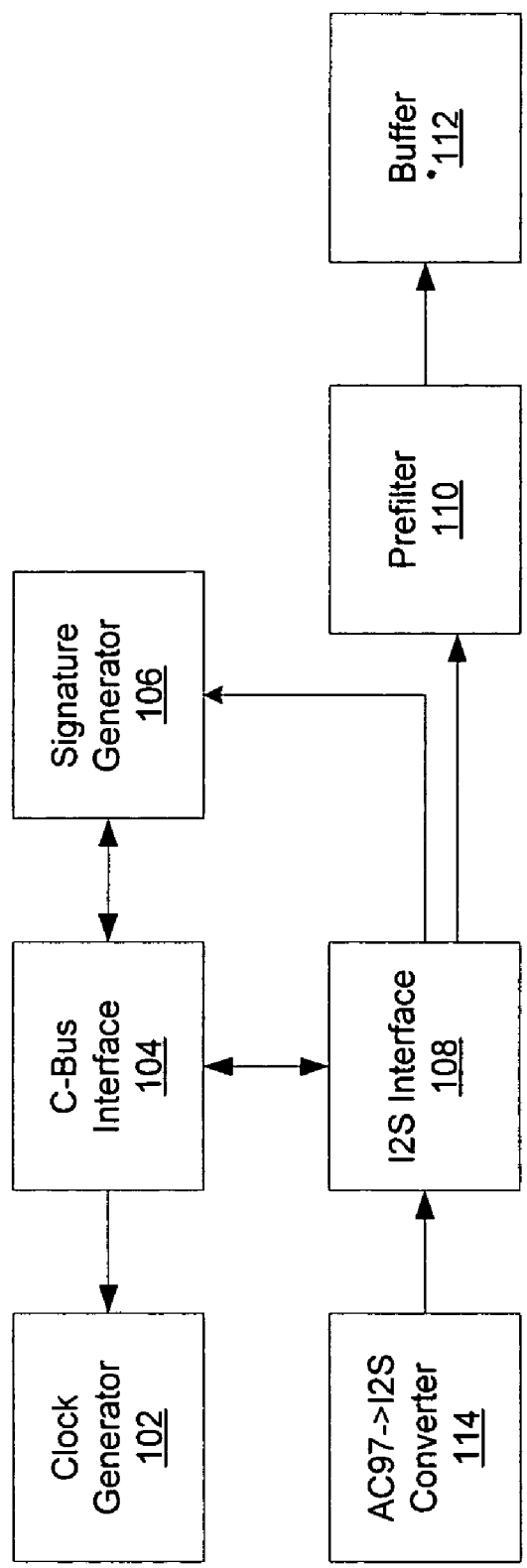
FIG. 1 illustrates an audio system according to an embodiment of the present invention.

FIG. 1 is an illustration of an audio module 100 according to an embodiment of the present invention. The audio module 100 comprises a C-Bus interface 104 which is communicatively coupled to a clock generator 102, an audio signature generator 106, and an I2S interface 108. The I2S interface 108 is also communicatively coupled to an AC97 to I2S converter 114, the audio signature generator 106 and a prefilter 110. The prefilter 110 is further coupled to a buffer 112 where the audio data is stored.

The audio module 100 supports an I2S interface 108 with three justify modes (Right-Justified, I2S-Justified and Left-Justified). The I2S (Inter-IC Sound) interface 108 is a serial bus designed for digital audio devices and technologies such as compact disc CD players, digital sound processors, and digital TV (DTV) sound. The I2S design handles audio data separately from clock signals. By separating the data and clock signals, time-related errors that cause jitter do not occur, thereby eliminating the need for anti-jitter devices. An I2S bus design consists of three serial bus lines: a line with two time-division multiplexing (TDM) data channels, a word select line, and a clock line.

The I2S interface 108 works at a master or slave mode. In the slave mode, all interface signals are driven from the outside. In the master mode, the clock generator 102 will be used to generate limited sample rate with different master clock (e.g., 24.576 MHz to 22.5792 MHz). In OKI mode, with a 2 MHz reference clock input, the clock generator 102 can generate bit clock and sync signals. The OKI mode supports short frame and long frame modes. In an embodiment, the word length could be from 8 bits to 16 bits, and the output can be 16 bits with zero padding at the end.

As an optional feature, an AC97 to I2S converter 114 enables monitoring of AC97 signals and converts them to I2S format data. This module can be bypassed.

Some configuration registers are connected to the C-Bus interface 104, which could be used to modify the I2S interface parameter.

In an embodiment, the audio pre-filter 110 is a digital data filter. It is used to drop data or re-arrange input data to other formats. The audio pre-filter 110 supports a left channel only mode, and an 8-bit width mode where only the high 8-bit data will be used and combined into a 16-bit output and only the left channel data is used.

In an embodiment, the audio sample rate can be set using seven configuration registers, each register having an 8-bit width. When an audio_sr_en signal is received, according to an audio_sr_idx signal, the low 8 bits of one of the seven registers (address 0x1031 through 0z1037) will be loaded into the low 8 bits of the clock generator configuration register (address 0x1000).

In an embodiment, the audio module 100 supports various types of ADPCM (Adaptive Differential Pulse Code Modulation). ADPCM is a form of pulse code modulation (PCM) that produces a digital signal with a lower bit rate than standard PCM. ADPCM produces a lower bit rate by recording only the difference between samples and adjusting the coding scale dynamically to accommodate large and small differences. ADPCM can be used to digitize a voice signal so voice and data can be transmitted simultaneously over a digital facility normally used only for one or the other.

Audio Signature

Depending on the application, digital audio and video data are typically captured separately, and they are synchronized later during playback. However, when doing audio and video capture, if the audio capture device uses a different clock than the video capture device, it is possible that the video frames might not synchronize with the relative audio samples because of the time shift between the two reference clocks. Moreover, frames may not synchronize if audio or video data are lost due to a buffer overflow.

Some devices or applications use the count imbedded inside the audio stream as the basis for synchronizing audio and video frames. The quality of the audio/video synchronization of the resulting stream will be very poor if audio samples are dropped or the audio sample rate is not equal to the video sample rate. In an embodiment, the video stream comprises of conventional formats such as AVI, MPEG, WMV, etc.

The audio signature generator module 106 is used to counter the problems associated with audio/video synchronization, such as problems due to differing sample clock rates and buffer overflow.

Figure 2:
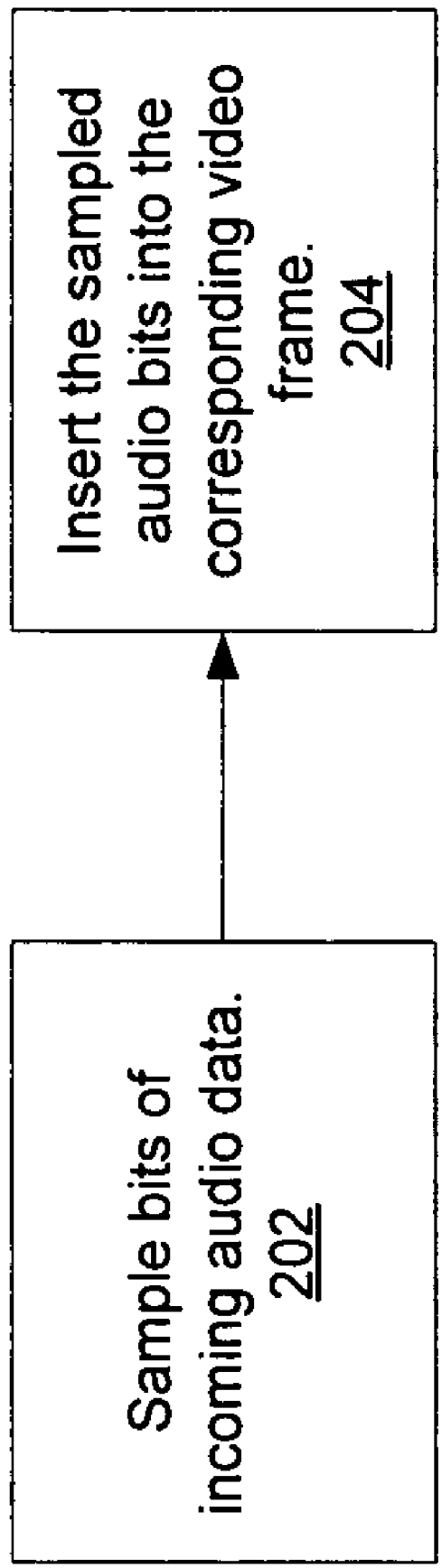
FIG. 2 illustrates a method for generating an audio signature, according to an embodiment.

FIG. 2 illustrates a method of generating an audio signature, according to one embodiment of the present invention. First, the signature generator 106 samples a few bits of incoming audio data, step 202. The signature generator 106 captures and inserts the audio bits into a corresponding video frame, step 204.

Figure 3:
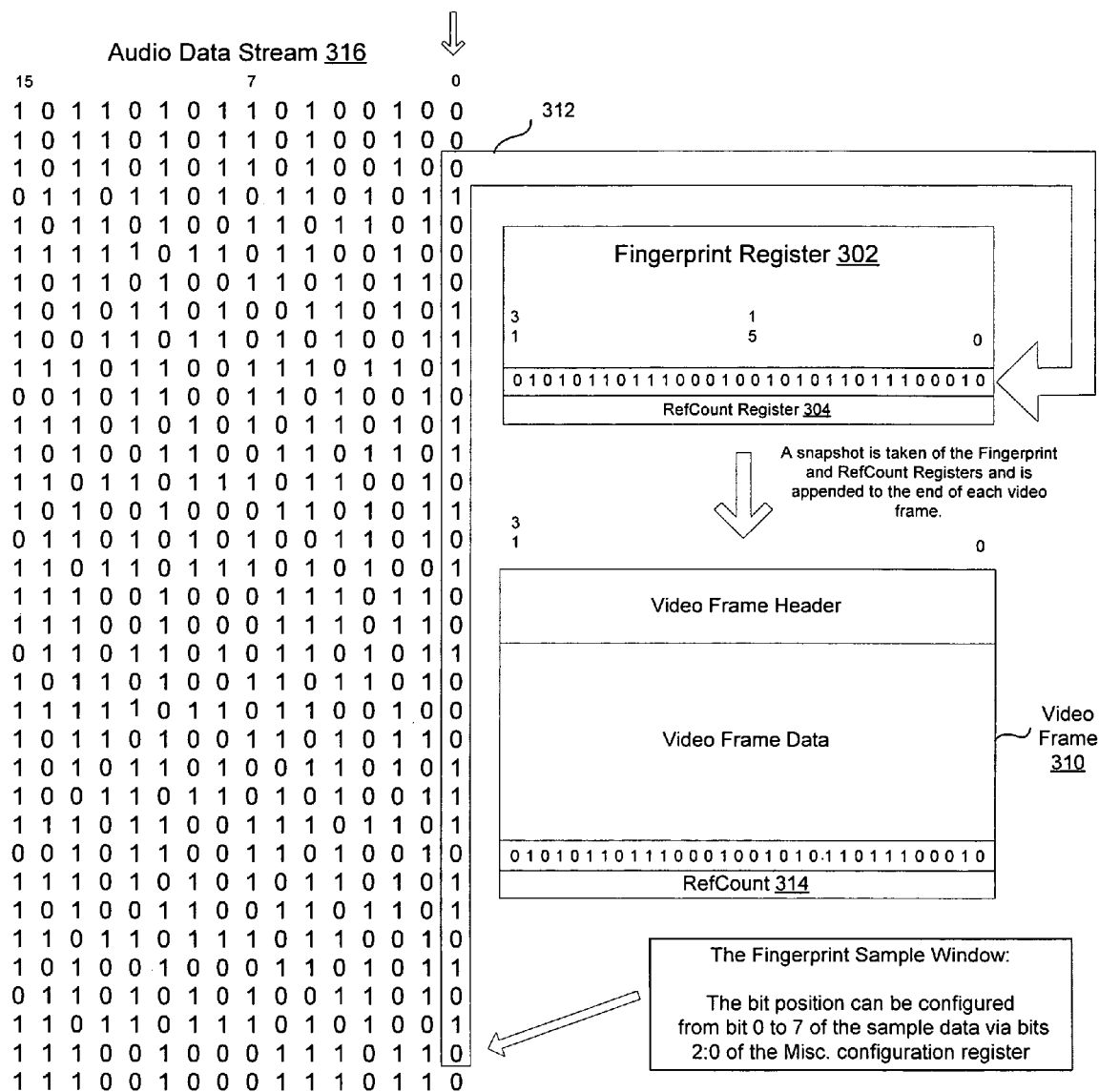
FIG. 3 illustrates the process and components used to generate an audio signature, according to an embodiment.

The audio signature consists of two parts, a fingerprint and a RefCount. FIG. 3 illustrates the audio signature process and components using an exemplary audio data stream 316, according to an embodiment. In a preferred embodiment, the audio stream format can be either PCM or ADPCM. In a preferred embodiment, two 32-bit registers (fingerprint register 302 and RefCount register 304) are used to store the fingerprint value 312 and RefCount value 314. The signature generator 106 creates a fingerprint by left shifting one bit from every 16 bit of audio data 316 into the fingerprint register 302 so that the register contains a one bit sample from each of thirty-two 16-bit words at any given time. The RefCount value 314 increments for every n*2 bytes of audio data 316, where n is the number of audio channels in the audio system. The signature generator 106 embeds the fingerprint value 312 in every video frame captured 310. At the same time, the signature generator 316 also embeds a running count of all audio samples into the video frame 310 as the RefCount value 314. Those skilled in the art will recognize that other audio stream formats can be supported and that register size may be bigger or smaller depending on the application.

Fast Reconstruction of the Audio and Video Stream

Once an audio signature has been generated and embedded in the video stream, a reconstruction method is required in order to synchronize the audio and video stream during playback. In a preferred embodiment, a hash lookup technique is used for extracting the fingerprint 312 from the audio data and matching it to the corresponding video frame 310.

Figure 4:
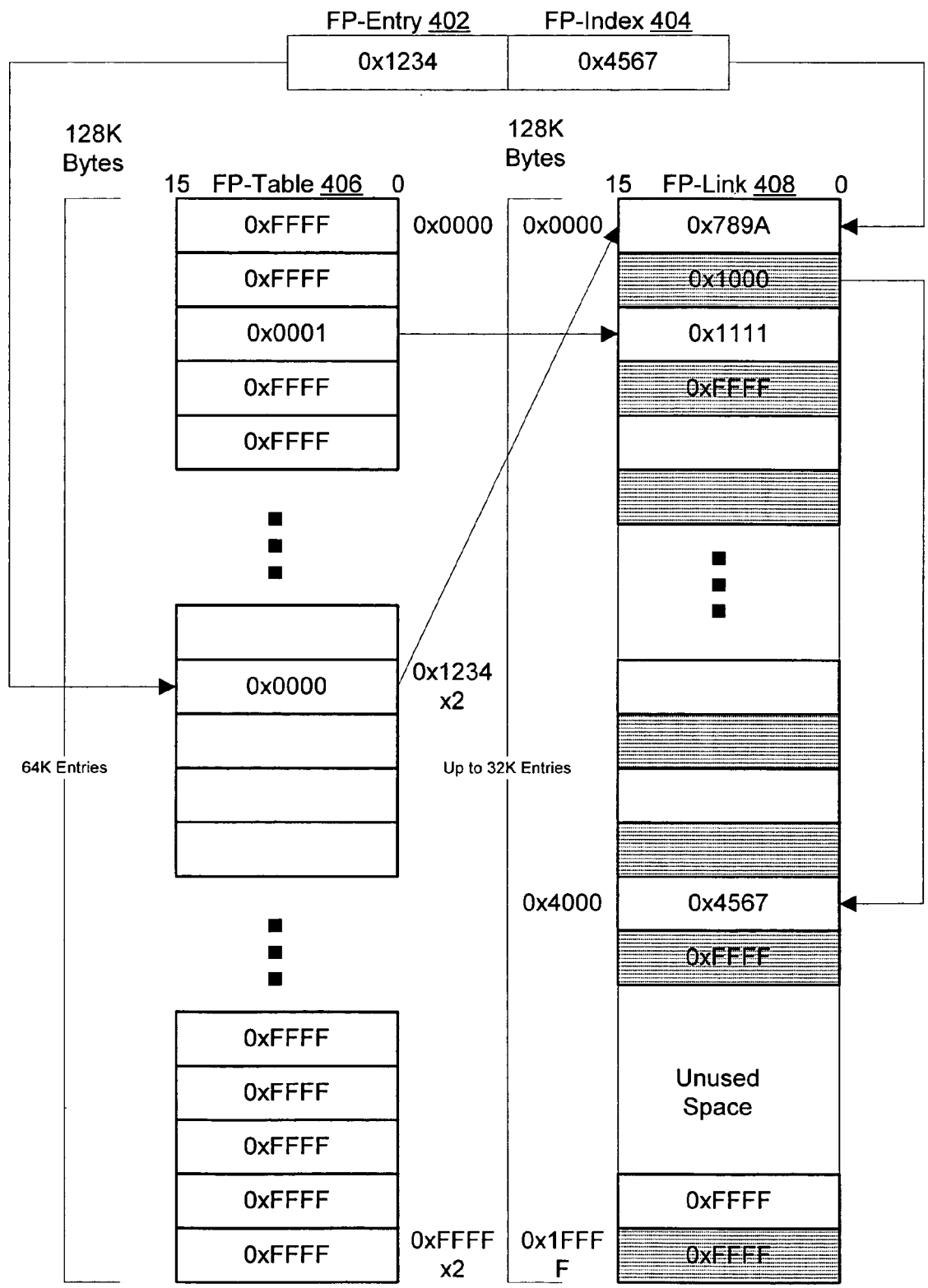
FIG. 4 illustrates a hash table used to reconstruct the audio and video stream, according to an embodiment.

FIG. 4 illustrates a hash lookup technique according an embodiment of the present invention. In this embodiment, the 32-bit fingerprint can be split into two 16-bit words, FP-Entry 402 and FP-Index 404. Thus, two blocks of memory are reserved for the lookup process, FP-Table 406 and FP-Link 408. The FP-Table 406 stores a pointer to the corresponding FP-Index value 404 and the FP-link buffer 408. The value of FP-Entry 402 is the location in the FP-Table buffer 406 of this pointer. According to this embodiment, the pointers to FP-Table 406 should be multiplied by two to get the appropriate address, and any unused entries are set to 0xFFFF. Moreover, the pointers to FP-Link 408 should be multiplied by four to get the address, and unused entries in FP-Link 408 are also set to 0xFFFF.

FP-Table 406 uses $2^m$ entries, m is the number of bits of FP-Entry 402. If m=16 then there must be 64K entries, at 2 bytes per entry the size of the buffer must be 128K bytes.

Each entry in the FP-Link buffer 408 has two items, the first is the value of FP-Index and the second is the position of next FP-Index with a common FP-Entry in the FP-Link buffer 408. This is done to compensate for the fact that it is possible to have several FP-Index values for any given FP-Entry value.

The hash table according to FIG. 4 can typically achieve a hit within three iterations. There is a 0.1% chance that any given lookup will require ten iterations. It is possible to reduce the memory required for the hash by almost half by reducing FP-Entry to 8 bits and increasing FP-index to 24 bits. This will result in an increase in the number of iterations to achieve a hit because the odds of FP-Index values with common FP-Entry values greatly increase.

Buffer Management

Audio and video data streams behave independently in that audio data samples and the corresponding video frames may not arrive in their respective buffers at the same time. The case where a video frame arrives before the audio frame is the most challenging since it must be buffered until the corresponding audio data with the corresponding fingerprint arrives. It is possible to manage the buffers such that an event of this type is kept as short in duration as possible to avoid video buffer overflow and excessive video latency.

The buffer management mechanism allows the user to change thresholds such as sample period and number of entries in FP-Link buffer. These thresholds may also be adjusted dynamically.

A software driver is performs the dynamic maintenance of the hash table. It is not necessary to synchronize all video frames, rather, it is adequate to sample over an adaptive period. A video frame is synchronized to audio data via the fingerprint if it occurs within the sampling period. Likewise the hash table is built from the audio data using the structures described above if the synchronization sampling period is active.

There are two ways to handle a match between fingerprint stored with the video frame and an entry in the hash table. One way is change the timestamp on video frame and audio samples, this works well for some stream formats like MPEG and WMV but it does not work well for AVI because an AVI file does not have precise timestamp. AVI files rely on the video frame and audio sample rates which are stored in the AVI header. It is possible to change these values in the header to compensate when needed but some video decoders cannot properly handle such modifications. Alternately some video frames could be dropped from or inserted into the stream. Only B-Frames or last P-Frames may be dropped.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for interlinking audio data and video data for synchronization by audio content comprising:
    forming an audio fingerprint by taking a bit sequence from an audio data;
    creating an audio signature by combining the audio fingerprint with a reference count that keeps a running count of all audio samples;
    embedding the audio signature in a video data, wherein the video data corresponds to the audio data.

2. The method of claim 1 wherein the embedding occurs when the video data is captured.

3. The method of claim 1, wherein the reference count is embedded in a video frame header.

4. The method of claim 1, wherein the reference count is a time stamp.

5. The method of claim 1, wherein the reference count increments for every plurality of bytes of audio data.

6. The method of claim 5, wherein the reference count increments for every n*2 bytes of audio data, wherein n is the number of audio channels.

7. The method of claim 1, further comprising extracting the audio signature from the audio data and matching the audio signature to the corresponding video data using a hash lookup.

8. The method of claim 7, wherein the audio signature is split into two words.

9. The method of claim 1, wherein the audio fingerprint is embedded in a video frame header.

10. The method of claim 1, wherein the audio data is in PCM format.

11. The method of claim 1, wherein the audio data is in ADPCM format.

12. A system for encoding an audio fingerprint comprising:
    a fingerprint register for receiving a bit sequence selected from an audio data;
    a signature generator for embedding the bit sequence in the fingerprint register in a video data, the video data corresponding to the audio data; and
    a reference count register for storing a reference count, wherein the reference count is a running count of all audio samples, wherein the signature generator embeds the reference count in the video data.

13. The system of claim 12, wherein the reference count increments for every plurality of audio data.

14. The system of claim 12, wherein one bit from every plurality of bits of audio data is shifted into the fingerprint register.

15. The system of claim 12, further comprising a hash table for synchronously reconstructing the audio data and the video data.

* * * * *